Nov. 25, 1952 E. J. LEGER 2,619,370
DRAGLINE MATERIAL HANDLING TRUCK
Filed Jan. 14, 1950 3 Sheets-Sheet 1
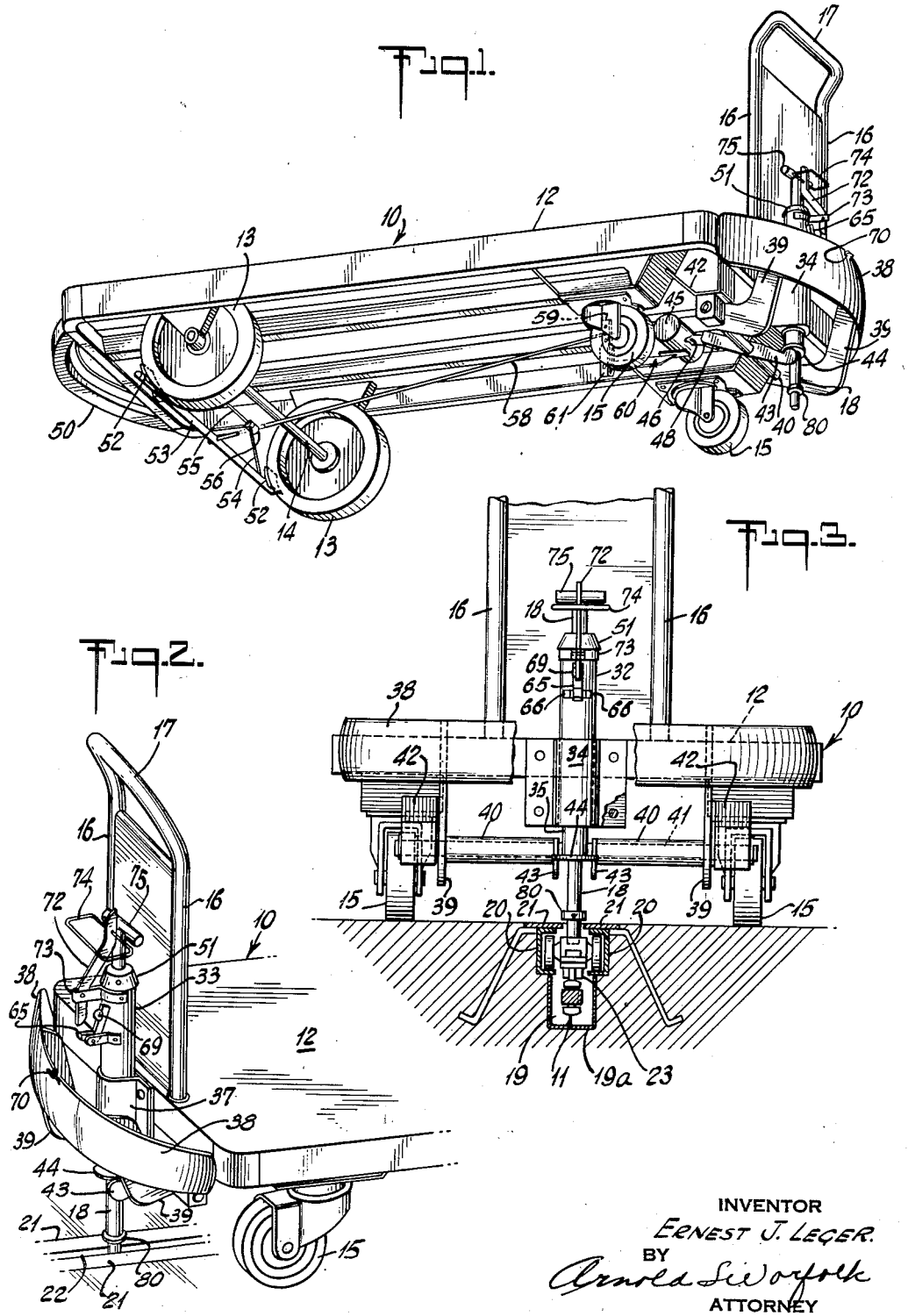
INVENTOR
ERNEST J. LEGER.
BY
ATTORNEY

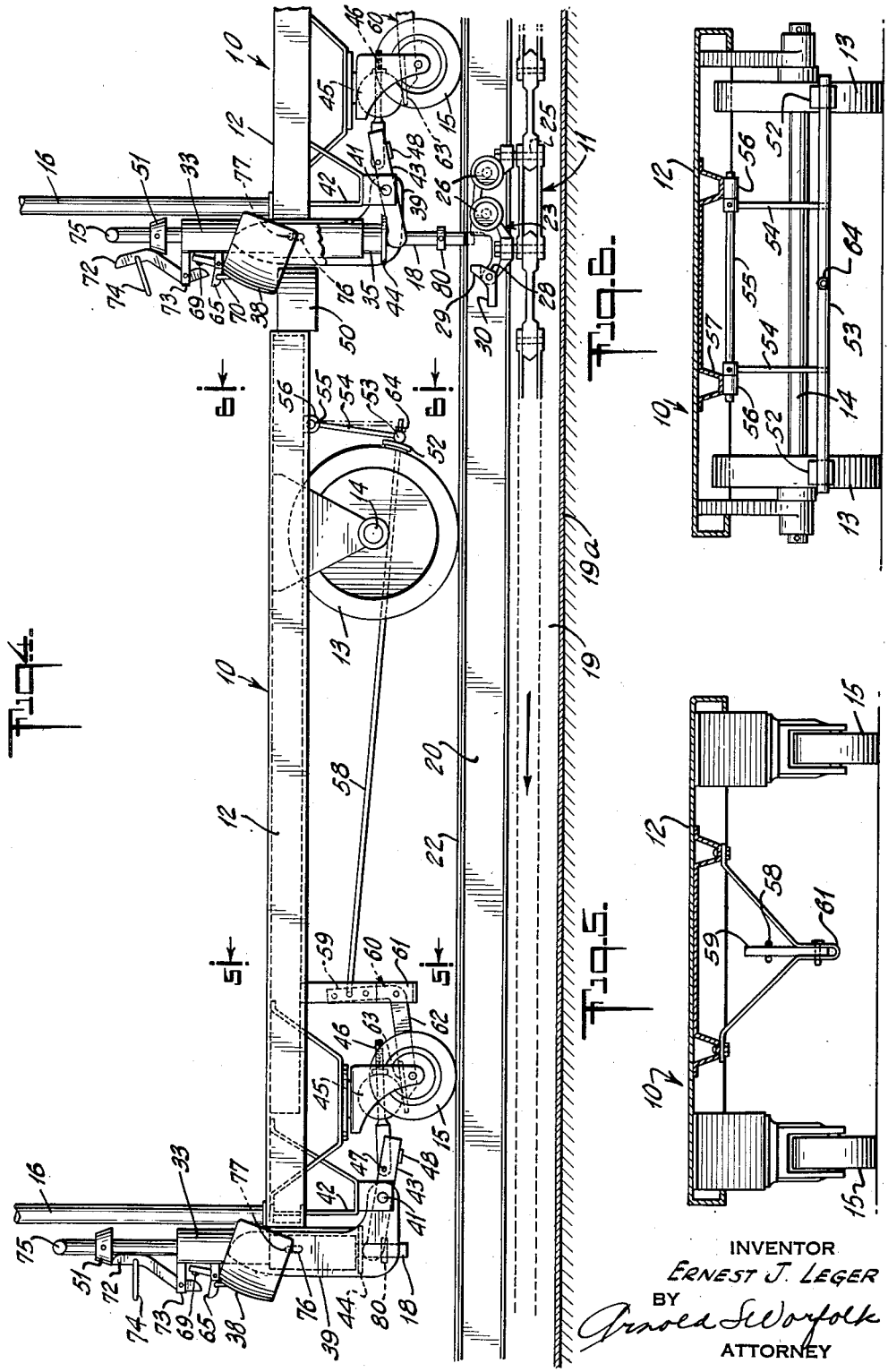

Nov. 25, 1952   E. J. LEGER   2,619,370
DRAGLINE MATERIAL HANDLING TRUCK
Filed Jan. 14, 1950   3 Sheets-Sheet 3
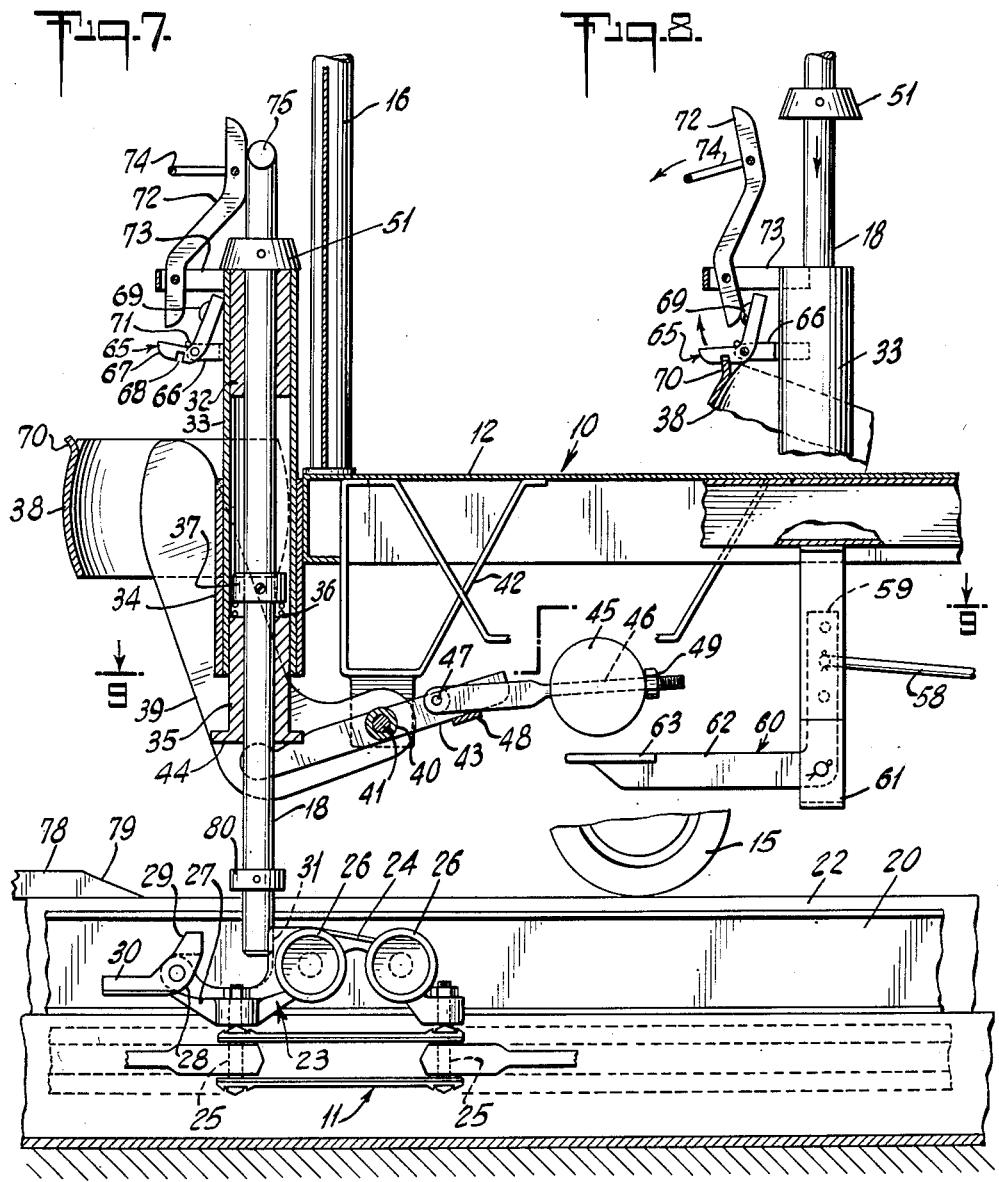
INVENTOR
ERNEST J. LEGER.
BY
ATTORNEY Patented Nov. 25, 1952

2,619,370

UNITED STATES PATENT OFFICE 2,619,370

DRAGLINE MATERIAL HANDLING TRUCK

Ernest James Leger, Metuchen, N. J., assignor to Johnson & Johnson, a corporation of New Jersey Application January 14, 1950, Serial No. 138,661

6 Claims. (Cl. 293—8)

This invention relates to a drag line materials handling truck capable of being connected to and disconnected from a continuously traveling chain which serves to pull the truck along.

According to the present improvements, the materials handling truck automatically disconnects itself from the traveling chain upon meeting an obstacle in its path and automatically connects itself again with the chain when the obstacle is removed.

Trucks equipped with the invention may be used either with overhead or underneath drag lines. In the illustrated embodiment, the drag line is arranged beneath the floor on which the truck travels. In this embodiment, the truck is equipped with a vertical connecting rod which passes through a guide slot in the floor overlying a traveling chain to engage a device on the chain through which motion is imparted to the truck. On meeting an obstacle, automatic mechanism moves the connecting rod out of engagement with the chain so that the truck comes to rest and so remains until the obstacle is removed. When the obstacle is removed, the connecting rod returns to its normal position ready to be engaged by the next device on the chain designed to transmit motion to the truck. In the operation just described, the connecting rod, in its inactive position remains in the guide slot so as to retain its registry with the chain.

Occasion may arise when it is desired to leave the truck in its arrested position regardless of whether there is an obstacle present. To this end, a manually operated device is provided which locks the connecting rod in its inactive position clear of the driving chain and which may be operated manually to release the connecting rod for restoration to its operative position. The connecting rod has a third position in which it clears not only the driving device on the chain but also the guide slot as well. A manually operated locking device holds the rod in this position, permitting the truck to be hauled entirely clear of the drag line system if desired.

The truck is provided with a brake device which operates to prevent recoil of the truck upon encountering an obstacle. If excessive recoil occurred, the connecting rod would be restored prematurely to its normal position ready to be engaged by the next driving device on the chain before the obstacle is removed and before it is intended that the truck should proceed. This might result in starting and stopping the truck for so long as the recoil is sufficient to back the truck clear of the obstacle and permit restoration of the connecting rod to its normal position. The brake device prevents recoil and eliminates this undesirable result. It permits the truck, once it has come in contact with an obstacle, to remain disconnected from the driving chain until the obstacle is removed. When the obstacle is removed, the brake is released and the truck is again automatically connected with the driving chain so that it may proceed on its way.

A better understanding of the invention may be had by referring to the accompanying drawings, of which:

Fig. 1 is a perspective view, looking upwardly toward the front right hand corner of a truck equipped with the present improvements;

Fig. 2 is a perspective view, looking downwardly toward the front left hand corner of the improved truck;

Fig. 3 is a front elevation of the improved truck with a portion of the connecting rod actuating mechanism broken away to show the operating parts, the connecting rod being shown in its operative position;

Fig. 4 is a side elevation illustrating two trucks in line, the first with its connecting rod fully retracted and out of engagement with the guide slot, and acting as an obstacle for the second truck whose connecting rod is in an intermediate position clear of the drive chain but not clear of the guide slot;

Fig. 5 is a transverse section on line 5—5 of Fig. 4;

Fig. 6 is a transverse section on line 6—6 of Fig. 4;

Fig. 7 is an enlarged detail view of the connecting rod and its associated mechanism with the parts all in normal position;

Fig. 8 is a detail view of the mechanism for locking the connecting rod in its partially retracted position, i. e., out of engagement with the traveling chain but not out of engagement with the guide slot; and Fig. 9 is a horizontal sectional view on line 9—9 of Fig. 7.

The improved truck was designed initially for use in connection with a drag line system at a materials shipping center, although it is susceptible of other uses as well. At the shipping center, the drag line is routed through an area in which the articles to be shipped are stored. An order picker, followed by a truck 10 which is dragged along by a continuously moving chain 11, proceeds to a destination to select articles for loading on the truck. At this station, the truck 10 may be arrested by placing an obstacle in its path causing it automatically to be disconnected from the driving chain whereupon the order picker selects and loads the truck with the desired articles. When the obstacle is removed, the truck automatically connects itself with the driving chain and proceeds to the next destination where the procedure is repeated.

Truck 10 has a flat platform 12 of suitable height for convenience in loading packages, a pair of wheels 13 rotatable on a transverse axis 14 fixed beneath the platform near the rear of the truck, and a pair of castor wheels 15 near the front which enables the truck to follow along any path determined by the direction of a pulling force exerted on the truck at the front.

A pair of vertical risers 16 fixed to the truck near the front are connected at the top by a cross bar 17 which provides a handle enabling the truck to be pulled or pushed manually when it is disconnected from the drag line. (Figs. 1, 2, and 3.)

The truck is provided at its front end with a rod 18 movable in a vertical direction to connect it with and disconnect it from the continuous chain 11 which travels parallel with the floor of the building in a chain housing 19 formed therein. Chain housing 19 comprises a U-shaped trough member 19a whose upper edges support a pair of spaced parallel and inwardly facing channels 20 which in turn support a pair of edgewise opposed parallel plates 21 spaced apart to present a slot 22 at the floor level through which the connecting rod 18 extends and which serves to guide the rod and consequently the truck, as the latter moves along under the drag of the continuously traveling chain (Fig. 3).

Chain 11 comprises a series of connected links and is driven by a suitable source of power, not shown. At suitable intervals along its length, the chain is supported by trolleys 23 which travel along on lower flanges of channels 20 of the chain housing. Some trolleys (not shown) are idlers and serve merely to support the chain. Others, however, are active in driving the truck and their construction is illustrated in Figs. 3 and 7. These trolleys comprise each a frame member 24 secured at the front and at the back on a pair of adjacent link pins 25 of the chain. Frame member 24 is supported by two pairs of rollers 26 which track along the flanges of the channel members 20 on the opposite sides of the chain. The frame member is formed with a portion 27 extending forwardly beyond the front pin 25, serving as a support for a dog 28 pivotally mounted thereon and which, in its normal position, presents an upwardly extending lug 29 whose purpose will presently appear. The dog 28 is biased to its normal position, which is determined by the engagement of a flat portion of its under surface with an underlying shoulder presented by the trolley frame, by the weight of a portion 30 thereof that extends forwardly beyond its pivot support.

According to the arrangement just described, an inactive trolley upon encountering the connecting rod 18 of a truck in the course of its forward travel, presents thereto first the lug 29 which turns to underride the rod, and then a rigid vertical shoulder 31 on the trolley frame which engages the rod and thereby imparts the motion of the chain to the truck. The dog 28 returns to its normal position when the connecting rod has passed over it, under the biasing action of its forward extension 30. In its normal position, the lug 29 on the dog serves to limit forward rebound of the truck that might occur when the driving trolley suddenly engages the connecting rod.

As previously stated, the connecting rod 18 is arranged for limited vertical movement into and out of engagement with drive trolleys 23 and, as occasion demands, into and out of engagement with the slot 22. To this end, connecting rod 18 is guided near its upper end by a bushing 32 fixed in and at the top of a sleeve 33 (Fig. 7). The sleeve is centrally supported at the front of the truck in a bracket 34 fixed to the truck frame. Connecting rod 18 is guided near its lower end by another bushing 35 slidably fitted for up and down movement in sleeve 33 at the bottom. Upward movement of sliding bushing 35 is imparted to connecting rod 18 through a shock absorbing spring 36 encircling the rod and located between the top of the sliding bushing and an overlying collar 37 pinned to connecting rod 18. Bushing 35 is retained in its normal position in sleeve 33 by a mechanism which serves automatically to lift the connecting rod out of engagement with the chain when the truck meets an obstacle.

As shown best in Figs. 3 and 7, the connecting rod lifting mechanism includes a bumper 38, cambered forwardly and extending transversely across the truck at the front, and a pair of L-shaped supporting arms 39 spaced laterally to give the bumper proper support. One arm of each L-shaped member extends upwardly for rigid connection with the bumper and the other rearwardly for rigid connection with a sleeve 40 rotatably mounted on a transverse shaft 41 which is supported at its ends in brackets 42 fixed to the truck beneath the platform 12 (Figs. 3 and 7).

There are two such sleeves 40 in coaxial alignment on the shaft 41 and the rearwardly extending arms of the respective L-shaped member are connected one at the outer end of each sleeve. A pair of parallel arms 43 disposed in a fore and aft direction are secured one at the inner end of each sleeve 40. Arms 43 have a portion extending forwardly from the sleeves 40 to engage beneath a flange 44 presented at the lower end of sliding bushing 35 and at the opposite sides of connecting rod 18. These arms are rounded off at their ends where they engage the flange. The connecting rod lifting mechanism further includes a counterweight 45 arranged for limited adjustment in a fore and aft direction on a bar 46 pivoted at its front end on a transverse pin 47 whose ends are mounted in portions of the arms 43 that extend aft of the sleeves 40 (Figs. 7 and 9). The weight supporting bar 46 is held in a normal position, in which it counterbalances the bumper and connecting rod mechanism, by a cross plate 48 underlying the weight-supporting bar 46 and which is fixed to arms 43 just rearwardly of the pivot pin that supports the counterweight bar. A nut 49, threaded on the end of the counterweight bar, provides limited adjustability of the counterweight in a fore and aft direction. Its normally adjusted position is such that the bumper and the connecting rod, whose combined weight it opposes, are in their normal positions as shown in Fig. 7. However, when a truck bumper 38 meets an obstacle such as a rear bumper 50 of a preceding truck, or any other obstacle for that matter, of a height sufficient to engage the bumper, it turns up to a position as shown by the second truck in line in Fig. 4, and in so doing lifts its associated connecting rod 18 clear of the trolley 23 on the driving chain, as the arms 43 which are integral with the bumper, act on the bushing 35.

When the obstacle is removed from in front of a truck, bumper 38 and connecting rod 18 drop to their normal positions, since their combined weight overbalances that of counterweight 45 as previously stated. When connecting rod 18 has returned to its normal position, as determined by a collar 51 pinned near the upper end of the connecting rod, banking against the top of sleeve 33, it will intercept the next driving trolley 23 on the chain that comes along.

Trucks 10 acquire substantial momentum as they move along under the influence of the driving chain. Accordingly they have a tendency to recoil upon meeting an obstacle with substantial inertia such as another truck and the extent of recoil might be sufficient to back the truck clear of the obstacle, permitting restoration of the bumper and the connecting rod mechanism to its normal position prematurely. To prevent this, trucks 10 are equipped with a brake mechanism which is rendered effective to prevent such recoil when bumper 38 is raised.

The brake mechanism includes a pair of brake shoes 52 arranged to engage one against each of the wheels 13 at the rear (Figs. 4, 5, and 6). Brake shoes 52 are mounted at the opposite ends of a transverse rod 53 hung by means of a pair of spaced links 54 from another transverse shaft 55 journaled at its ends in bearings 56 supported by a bracket 57 which is secured to the underside of the truck platform. Links 54 are pinned to shaft 55 but since this shaft is free to rotate in its bearings, the brake shoes may be rocked in a fore and aft direction into and out of engagement with the periphery of the wheels to apply or release the brake.

Brake shoes 52 are moved into and out of engagement with wheels 13 through the medium of a long tie rod 58 whose rear end is connected to cross bar 53 at the center and whose front end is connected to the vertical arm 59 of a bell-crank lever 60 fulcrumed on a bracket 61 suspended from the truck frame. Bellcrank lever 60 has a forwardly extending substantially horizontal arm 62 presenting at its front end, a bearing surface 63 which underlies counterweight 45 associated with the mechanism for actuating the connecting rod 18 (Figs. 7 and 9). According to this arrangement, as bumper 38 tilts upwardly, counterweight 45 moves downwardly and the parts are so adjusted that the counterweight engages the underlying bearing surface 63 of the bell-crank lever 60 just prior to the time that the connecting rod 18 clears its driving trolley 23. Consequently, when connecting rod 18 moves clear of its driving trolley, counterweight 45 exerts its full force upon the bell-crank lever to urge it in a counter-clockwise direction as viewed in Fig. 7. Bell-crank lever 60, under the action of the counterweight, pulls transverse bar 53 forwardly and it, in turn, moves the brake shoes 52 to apply a braking effect on the wheels 13. Recoil of the truck is thereby prevented.

Looking at Fig. 4, and particularly at the second truck shown therein, it is apparent that if there is no recoil, bumper 38 remains in its raised position and connecting rod 18 stands clear of the driving trolleys until the obstacle is removed, whereupon the parts are restored to their normal positions. As this occurs counterweight 45 is lifted off the bell-crank lever 60 so that brake shoes 52 release the wheels. Variations in braking effect may be obtained by connecting rod 58 to bell-crank lever 59 at one or another of the different positions shown, thereby varying the mechanical advantage that is effective in applying the braking pressure, and also by changing the effective length of rod 58 as by turning up or backing off a nut 64 which is threaded on the rod at its rear end and which bears against the transverse rod 53 supporting the brake shoes.

On occasions, it may be desirable to hold the connecting rod 18 in its intermediate position, i. e., clear of the driving trolleys but not clear of the guide slot 22, in the absence of an obstacle to hold the bumper in its raised position. For this purpose there is provided a latch lever 65, in the form of a bell-crank, pivotally mounted between a pair of arms 66 fixed near the top of and extending forwardly from the sleeve 33 (Fig. 7). One arm of the latch lever extends forwardly and has its lower edge rounded off near the front as at 67. At the rear of its rounded-off portion, the latch lever is formed in its lower edge with a notch 68. Another arm of the latch lever 65 extends upwardly and is formed with a boss 69 serving in one of its functions, to bias the latch to an inactive position. However, when it is desired to retain connecting rod 18 in its intermediate position, latch 65 is turned forward manually so that when bumper 38 is raised a forwardly protruding lip 70, in the upper edge thereof, engages in the notch 68. The latch holds the bumper in this position until released. When latch 65 is moved forward to its active position, a small horizontal pin 71 fixed thereon and whose ends protrude beyond the lateral faces of the latch, engages the upper edges of latch supporting arms 66 in order to prevent the nose of the latch from dropping down to a position that would interfere with the movement of the bumper into latching position. When latch 65 is thus positioned by pin 71, the rounded end of the latch permits lip 70 on the bumper readily to slide beneath the latch and into engagement with the notch.

Bumper 38 is released for restoration to its normal position, by another lever 72 which is fulcrumed on a forwardly extending bracket 73 fixed on sleeve 33 above latch 65. (Figs. 7 and 8.) Lever 72 has a portion extending below its fulcrum and located directly in front of the upwardly extending portion of latch 65. This lever also has a portion extending above its fulcrum which slopes upwardly and rearwardly for a portion of its length and then vertically for the remainder of its length. It is provided at the front and near the top with a handle 74 and its arrangement is such that when the operator pulls this handle forward the lower end of lever 72 engages boss 69 of latch lever 65 and turns it clockwise to move the notch 68 clear of lip 70 on the bumper. When the bumper is thus released, it, together with the connecting rod 18 return to their normal positions under their own weight. The edge of lever 72 adjacent the boss 69 is rounded-off to facilitate the operation just described.

Lever 72 also serves to hold connecting rod 18 in its topmost position clear of the guide slot 22, as for instance, when it is desired to move the truck temporarily out of service away from the drag line system. A horizontal bar 75 fixed at the top of connecting rod 18 serves as a handle to pull the rod upwardly. When the rod is raised sufficiently, lever 72 may be turned so that its upper end engages beneath collar 51 which is pinned on the connecting rod (Fig. 4—first truck). Connecting rod 18 is thus held in its raised position until released by pulling forward on lever 72 in the same manner as when latch 65 releases the bumper. When connecting rod 18 is released it will, of course, drop all the way down to its normal position.

When connecting rod 18 is in its fully raised position, bumper 38 is counterbalanced upwardly so that bushing 35 at the lower end of sleeve 33 is in a somewhat higher position than when the connecting rod is in its normal position. Consequently, when the connecting rod drops from its topmost position, the collar 37 thereon strikes first the spring 36 located above the bushing. The shock of the falling connecting rod is thereby to some extent absorbed. Collar 37 is adjustable up and down the connecting rod 18 to a position which is most effective for this purpose and to this end the sleeve 33 is formed with a slot 76 giving access to a set screw 77 which is threaded radially through the collar and into engagement with the rod, in order to facilitate making the proper adjustment (Fig. 4).

In some instances it may be desirable to stop the trucks automatically at a given station without use of a device acting through the bumper. This may be done by fixing a shoe 78 with a registering slot above the guide slot 22 and which has an upper surface 79 inclining downwardly toward the advancing truck. Then, by fixing a collar 80 on the connecting rod 18 near its lower end, the connecting rod will be lifted out of engagement with its driving trolley as the collar engages and rides up the inclined surface of the shoe. The truck again can be connected with the driving chain merely by pushing the truck manually until collar 80 drops off the trailing edge of the shoe and permits connecting rod 18 to drop back into its normal position to be picked up by the next approaching trolley.

The invention has been described in its preferred form, but many embodiments thereof are included within its spirit. The invention, therefore, is to be limited only by the scope of the appended claims.

I claim:

1. A materials handling truck comprising a body mounted on wheels, a movable device normally biased to operative position and mounted on the truck for connecting the truck with a drag line when the device is in operative position, a member movably arranged on and at the front of the truck for actuation by an obstacle to the truck's movement, and which likewise is biased to a normal position corresponding to the operative position of the connecting device, and means mounted on the truck and operated by said member and for moving the connecting device to inoperative position when the member is moved out of normal position and for releasing the connecting device when the said member is restored to normal position whereby said connecting device is automatically restored to operative position.

2. A materials handling truck comprising a body mounted on wheels, a movable device normally biased by its own weight to operative position and mounted on the truck for connecting the truck with a drag line when the device is in operative position, a member movably arranged on and at the front of the truck for actuation by an obstacle to the truck's movement, and which likewise is biased to a normal position corresponding to the operative position of the connecting device, and means mounted on the truck and operated by said member for moving the connecting device to inoperative position when the member is moved out of normal position and for releasing the connecting device when the said member is restored to normal position whereby said connecting device is automatically restored to operative position under the influence of its own weight.

3. A materials handling truck comprising a body mounted on wheels, a movable device normally biased by its own weight to operative position and mounted on the truck for connecting the truck with a drag line when the device is in operative position, a member movably arranged on and at the front of the truck for actuation by an obstacle to the truck's movement and which likewise is biased to a normal position corresponding to the normal position of the connecting device, means mounted on the truck and operated by said member for moving the connecting device to inoperative position when the member is moved out of normal position and for releasing the connecting device when the said member is restored to normal position whereby said connecting device is automatically restored to operative position under the influence of its own weight, and means reacting between a frame portion of the truck and the connecting device for partially counterbalancing the weight of the connecting device.

4. A materials handling truck comprising a body mounted on wheels, a movable device normally biased to operative position and mounted on the truck for connecting the truck with a drag line when the device is in operative position, a bumper pivotally mounted on and at the front of the truck for actuation by an obstacle to the truck's movement and which likewise is biased to a normal position corresponding to the operative position of the connecting device, and means mounted on the truck and operated by said bumper for moving the connecting device to inoperative position when the bumper is moved out of normal position and for releasing the connecting device when said bumper is restored to normal position whereby said connecting device is automatically restored to operative position.

5. A materials handling truck comprising a body mounted on wheels, a movable device normally biased to operative position and mounted on the truck for connecting the truck with a drag line when the device is in its operative position, a bumper pivotally mounted on and at the front of the truck for actuation by an obstacle to the truck's movement and which likewise is biased to a normal position corresponding to the operative position of the connecting device, means mounted on the truck and operated by said bumper for moving the connecting device to inoperative position when the bumper is moved out of normal position and for releasing the connecting device when said bumper is restored to normal position whereby said connecting device is automatically restored to operative position, a wheel brake on the truck, and means for automatically rendering the brake active when the connecting device is moved to inoperative position and for releasing the brake when the connecting device is moved to an operative position.

6. A materials handling truck comprising a body mounted on wheels, a movable device normally biased to operative position and mounted on the truck for connecting the truck with a drag line when the device is in operative position, a bumper pivotally mounted on a support on and at the front of the truck for actuation by an obstacle to the truck's movement and which likewise is biased to a normal position corresponding to the operative position of the connecting device, means mounted on the truck and operated by said bumper for moving the connecting device to inoperative position when the bumper is moved out of normal position and for releasing the connecting device when said bumper is restored to normal position whereby said connecting device is automatically restored to operative position, means reacting on the bumper and about its pivotal support for partially counterbalancing the weight of the bumper and of the connecting device, and a wheel brake on the truck rendered active by said counterbalancing means when the connecting device is moved to inoperative position and inactive when the connecting device is moved to operative position.

ERNEST JAMES LEGER.

REFERENCES CITED

The following references are of record in the file of this patent:

UNITED STATES PATENTS

| Number | Name | Date |
| --- | --- | --- |
| 414,304 | Espel | Nov. 5, 1889 |
| 562,881 | Ball | June 30, 1896 |
| 1,000,106 | Morris | Aug. 8, 1911 |
| 1,420,115 | Lange | June 20, 1922 |